Nov. 5, 1929.  R. L. HAYNES  1,734,806
SNUBBER FOR AUTOMOBILES
Filed Nov. 9, 1925   2 Sheets-Sheet 1
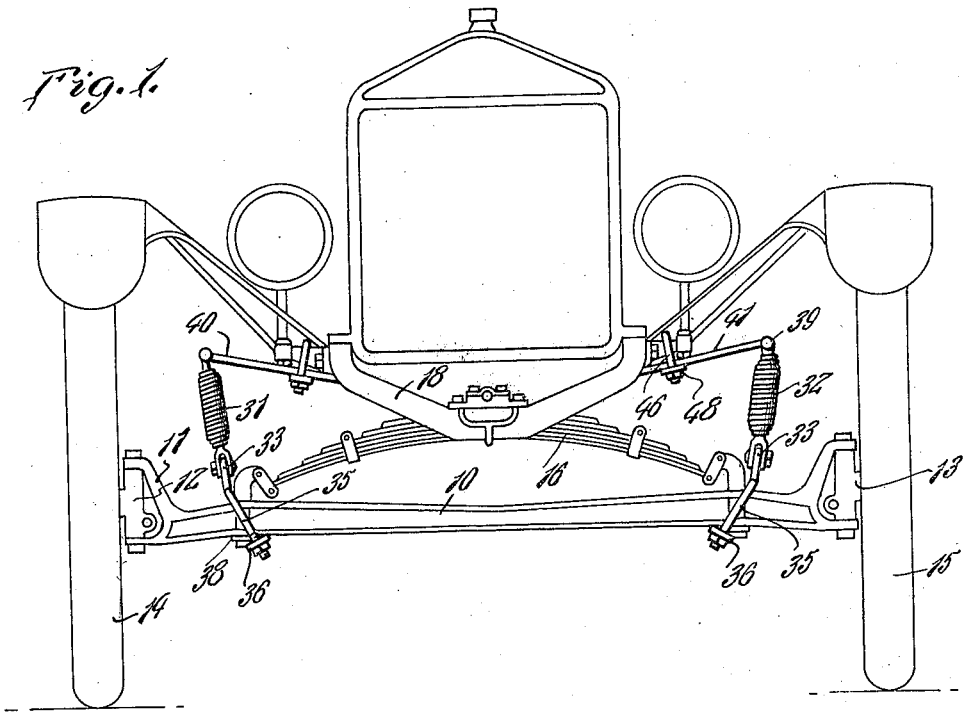
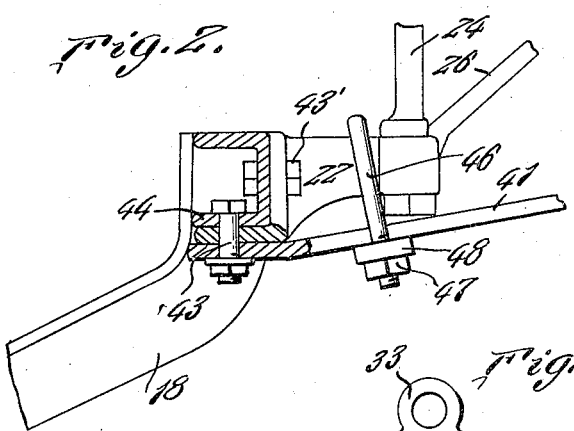
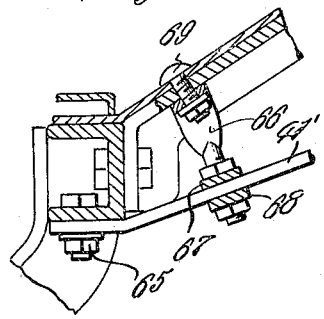
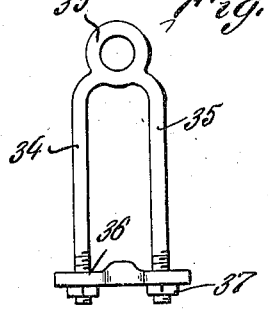
R. L. Haynes, INVENTOR
BY Victor J. Evans, ATTORNEY

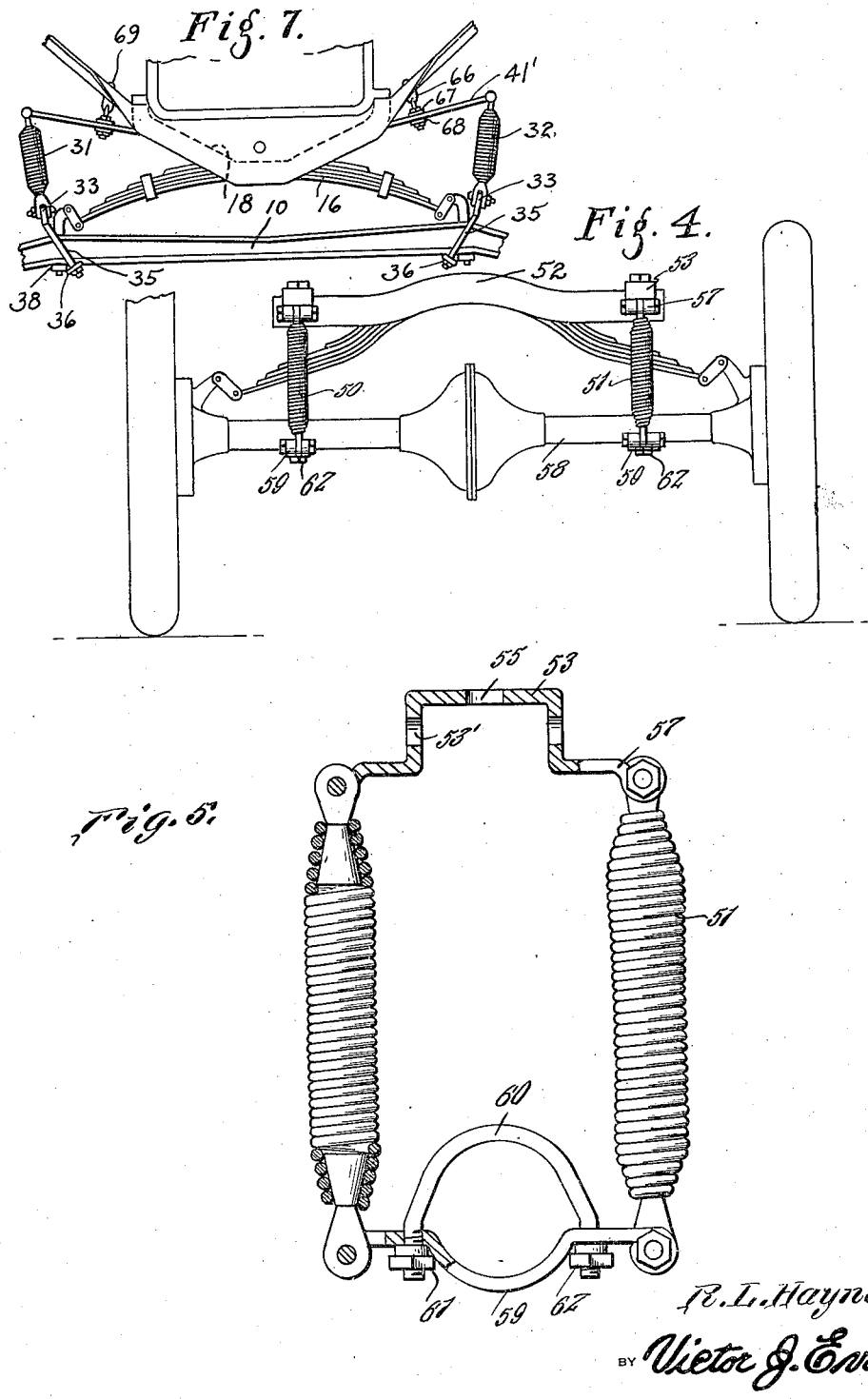

Patented Nov. 5, 1929

1,734,806

UNITED STATES PATENT OFFICE

RUFUS L. HAYNES, OF SMACKOVER, ARKANSAS, ASSIGNOR OF ONE-HALF TO JAMES O. MODISETTE, OF JENNINGS, LOUISIANA

SNUBBER FOR AUTOMOBILES

Application filed November 9, 1925. Serial No. 67,886.

The object of this invention is to provide improved means for taking up the shock, on the rebound, when a motor vehicle is traveling over an uneven roadway.

A further object is to provide means for attachment to a standard type of motor vehicle, without the aid of a skilled mechanic, or with but little skilled assistance in connection with recent models.

A further object is to provide means, of special construction, for connecting coiled springs with the front axle and with the housing of the rear axle, and special means for connecting these springs with the structure of the frame.

With the foregoing and other objects in view, the invention consists in the novel construction and arrangement of elements described, illustrated and claimed, it being understood that modifications may be made within the scope of the claims, without departing from the spirit of the invention.

In the accompanying drawing forming part of this application, Figure 1 is a view in front elevation, showing the body of the forward portion of the vehicle, and showing especially my improvement applied thereto.

Figure 2 is a fragmentary view showing a portion of the front element of the frame, and showing the manner of connecting an arm for one of the coiled springs of Figure 1 to the standard frame construction including a lamp mounting device.

Figure 3 shows a U-bolt having an upper eye member this U-bolt being designed to connect the lower ends of the coiled spring with the front axle.

Figure 4 shows the mounting of the snubbing devices with reference to the housing of the rear axle and the rear element of the frame.

Figure 5 is a view in elevation and section showing a yoke member to be mounted on the rear element of the frame, and means for connecting the lower ends of the coiled spring, with the housing of the rear axle.

Figure 6 is a detail view, chiefly in section showing the manner of mounting, on a new Ford model, the arm designed for connection with the upper end of each of the coiled springs.

Figure 7 shows the construction last named in its relation to associated elements.

The front axle of a Ford automobile is designated 10, this axle having forked ends 11 in which knuckles 12 operate, these knuckles supporting the wheels spindles 13 mounting the front wheels 14 and 15.

The front leaf frame 16 is mounted as usual with reference to the axle 10, the perches being designated 16 and 17. The front element of the frame, shown at 18, is connected with the leaf spring 16 in the usual manner, and extending outwardly from the main frame are brackets 21 and 22 mounting the lamp standards 23 and 24 and the fender arms 25 and 26.

The coiled springs 31 and 32 are each connected by means of a U-bolt of the type shown in Figure 3, with the front axle 10, the bolt including an upper eye member 33 and eye members 34 and 35, the eye members having connection with the upper ends of the coiled springs. Elements 34 and 35 pass on opposite sides of axle 10, and the extreme ends receive a plate or tie bar 36 secured by nuts such as 37. The U-bolt has the relation to the perches shown in Figure 1, and the plates engage the nut 38 in the manner there illustrated, in order that the U-bolt may be positively retained when the upper portions of these elements engage the perches.

The upper ends of springs 31 and 32 are secured at 39 to arms 40 and 41, the latter being mounted as shown in detail in Figure 2, and having connection by means of bolts 43 with frame element 44, the bolts 43 and 43' being employed in standard construction.

Bars 40 and 41 are retained by U-bolts 45 and 46, the side members of the U-bolts passing on opposite sides of the lamp bracket and opposite sides of the arms 40 and 41, the ends of the bolts being secured by nuts 47 retaining tie members 48.

Figure 4 shows coiled springs 50 and 51 applied to the housing of the rear axle, and connected with an element 52 of the frame. The connection is effected by means of upper yoke members 53 apertured at 55 for retaining bolts passing thru frame element 52.

The end of yoke members 53 are outwardly deflected and are secured at 57 to the upper ends of the coiled springs 50 and 51, the lower ends of these springs being secured to a clamping device adapted to engage the housing 58 of the rear axle. These clamping devices include lower member 59 and upper U-members 60 secured by means of nuts 61 and 62.

In order to apply this construction to a recent Ford model, the yokes 53 and 54 are provided with side apertures 53' for a special bolt adapted for use in connecting the device with the frame.

Figure 6 shows the special construction employed for the front axle, in connection with the mounting of arms 41' for the front coiled springs. The end of arm 41' is secured by bolt 65 and in order to make arm 41' rigid, I provide a U-bolt 66, tie plates 67 and 68, and connect the U-bolt member with the frame by bolt 69.

What is claimed is:

1. In a device of the character described, a vehicle frame, mounting means thereon, an axle, arms extending laterally from the frame, springs connected with the arms, spring perches mounted on the axle, and U-bolts projecting on opposite sides of the axle and of the perches, and deflected inwardly and downwardly with reference to the perches, means securing the perches, and means securing the U-bolt to the axle and engaging the perch securing means to prevent lateral movement of the U-bolts.

2. A device of the character described, a vehicle frame, mounting means on the frame, an axle, arms extending laterally from the frame, brackets extending from said frame on each side, U-bolts engaging the brackets and engaging the arms, means for securing the U-bolts to each of the arms, coiled springs depending from the outer ends of the arms, and U-bolts connecting the lower ends of the coiled springs with the axle, said U-bolts last named each including an upper eye member for effecting connection with the coiled springs, perches carried by the axle and adapted to mount a leaf spring, and means for connecting the second named U-bolt with the axle and perches.

3. A device of the character described, a vehicle frame, mounting means on the frame, an axle, arms extending laterally from the frame, springs connected with the ends of the arms, means connecting the springs with an axle of the vehicle, an upwardly extending element projecting from the frame on each side thereof, a U-bolt secured to the under side of each upwardly extending element and depending therefrom, tie bars engaging opposite sides of the arms, and means for securing said bars and arms to the U-bolts.

In testimony whereof I affix my signature.

RUFUS L. HAYNES.